United States Patent
Schaaf et al.

[15] 3,699,503
[45] Oct. 17, 1972

[54] PROBE CONSTRUCTION

[72] Inventors: Gunther Schaaf, Fridley; Nathan R. Smith, Minneapolis, both of Minn.

[73] Assignee: Ramsey Engineering Company, St. Paul, Minn.

[22] Filed: March 2, 1971

[21] Appl. No.: 120,213

[52] U.S. Cl............339/176 P, 339/150 B, 324/72.5
[51] Int. Cl. .............................................H01r 13/50
[58] Field of Search.........324/72.5, 158 P; 339/31 T, 339/97 T, 108 TP, 147 P, 149 P, 150 B, 176 P, 273, 206; 279/39, 40

[56] References Cited

UNITED STATES PATENTS

| | | | |
|---|---|---|---|
| 2,975,894 | 3/1961 | Hill et al. | 209/72 |
| 951,631 | 3/1910 | Dake | 324/72.5 |
| 2,504,338 | 4/1950 | MacLatchie | 339/108 TP |
| 3,049,663 | 8/1962 | Sauer | 324/72.5 |

OTHER PUBLICATIONS

Kelly et al., "Ferrite Core Testing Probe," IBM Tech. Disc., 02–1959, Vol. 1, No. 5, p. 20.

*Primary Examiner*—Marvin A. Champion
*Assistant Examiner*—Lawrence J. Staab
*Attorney*—Dugger, Peterson, Johnson & Westman

[57] ABSTRACT

A test probe for use in machines for testing magnetic cores. The probe is clamped in chuck jaws which are used for making contact with the test circuit and which keep the total indicated run out of the probe within acceptable limits even when very small cores are being treated.

15 Claims, 4 Drawing Figures

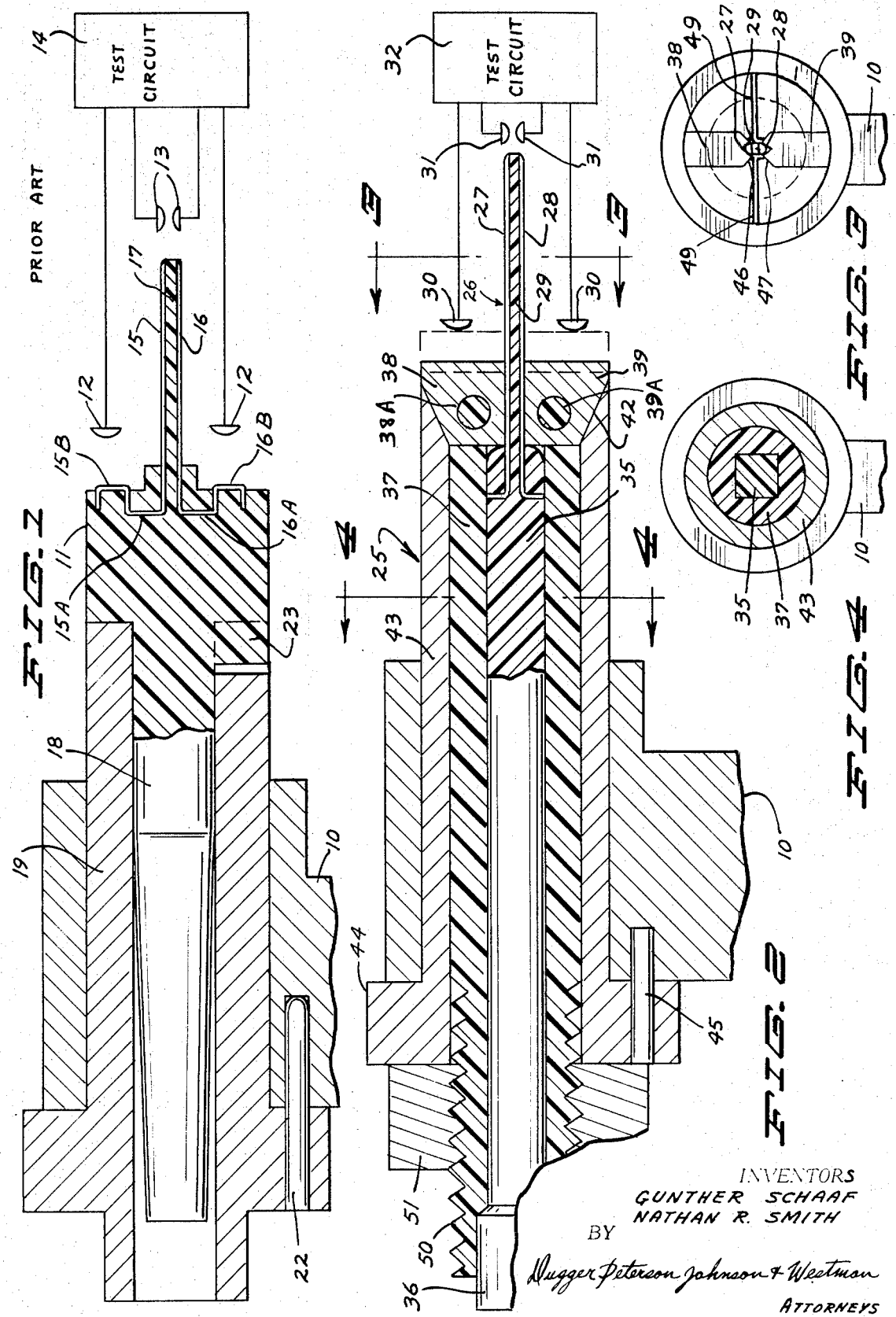

PROBE CONSTRUCTION

BACKGROUND OF THE INVENTION

1. Field of the Invention.

The present invention relates to probes for use in automatic magnetic core testing devices.

2. Prior Art.

The prior art probes utilized in testing devices are exemplified by that shown on the Patent to J.L. Hill et al., U.S. Pat. No. 2,975,894. The probe of the present invention is made to operate at higher speeds, have less total indicated run out, and to be more reliable as well as cheaper than that shown in the Hill et al patent.

Another probe construction is shown as an exemplification of prior art in the present drawings. The illustrated prior art probe is used in testing devices such as that as shown in the aforementioned Hill et al Patent, or in the core handling and testing device shown in U.S. Pat. No. 3,415,368. The contact location for the probe of the present invention is shown in U.S. Pat. No. 3,415,368 and the probe of the present invention may be mounted into the probe arm shown in this patent.

SUMMARY OF THE INVENTION

The present invention relates to a probe construction for use with magnetic core testing devices. More particularly, the device comprises a split probe which will permit completion of two circuit loops electrically insulated from each other through a magnetic core. The construction includes an easily molded split probe, held in clamping jaws that are clamped with a frusto-conical tapered surface so that the unit is centered positively with respect to an outer mounting member and the total indicated run out on the probe is maintained at a very low level.

The jaws for clamping the probe are molded into a sleeve that mounts into an outer housing, and the sleeve has a surface that urges the jaws against the probe. The metal jaws are exposed at the outer end of the assembly, and form contacts for completing test circuits in combination with other contacts resting on the sides of the split probe.

The unit is keyed or locked into proper rotational position when it is mounted in a probe arm. The probe molding operation is relatively simple, thus reducing the cost and increasing the reliability of the completed assembly. No complex wire bending is necessary.

BRIEF DESCRIPTION OF THE DRAWINGS

FIG. 1 is a side sectional view of a typical prior art probe enlarged greatly for clarity;

FIG. 2 is an enlarged vertical sectional view of a probe made according to present invention;

FIG. 3 is a sectional view taken as on line 3—3 in FIG. 2; and

FIG. 4 is a sectional view taken as on line 4—4 in FIG. 2.

DESCRIPTION OF THE PREFERRED EMBODIMENT

Referring first to the prior art device of FIG. 1, the construction in this particular instance includes a probe arm 10 that is utilized with the testing machines as in the aforementioned prior art patents and which reciprocates to move the probe assembly indicated at 11 between a retracted position substantially as that shown in FIG. 1. The probe assembly moves to engage a first pair of contacts, 12,12 and a second pair of contacts 13,13 which are connected to a suitable test circuitry 14 in the usual manner for testing devices such as magnetic cores. The probe assembly itself comprises a split type probe needle that comprises a pair of metallic electrodes made up of very thin wire indicated at 15 and 16 respectively separated by a layer of insulation 17 similar to the construction shown in the aforementioned Hill et al. U.S. Pat. No. 2,975,894. The electrodes 15 and 16, as shown are bent into portions indicated at 15A and 16A respectively that extend outwardly from the axis of the probe assembly, and the electrodes also have forwardly protruding sections 15B and 16B, respectively which form electrode contacts aligning with the contacts 12,12. The entire probe assembly, including the electrodes has to be held very precisely, and then molded into a mounting block 18 that is of an insulating material. The block 18 is mounted into a probe holder 19 that in turn is attached to the probe arm 10. The holder 19 can be mounted in any suitable manner such as with a pin 22, and an interlocking guide indicated at 23 can be used for holding the probe properly oriented. Further, the size is extremely small, and bending the electrodes as shown is very difficult. In operation, the probe arm reciprocates so that the electrodes 15 and 16 alternately make contact with their respective contacts 12 and 13, and are removed from the contacts. The magnetic cores are held so that the cores are between the contacts 12 and 13 and are surrounding the electrodes. The magnetic cores would drop down for testing as shown in the said U.S. Pat. No. 2,975,894.

The problems of making this prior art probe assembly are many, and the costs are quite high because of the high precision that is necessary. The total indicated run out in the probes has to be within very tight limits, and holding the electrode assembly when it is bent as shown with sufficient accuracy for molding so that the contacts 15B and 16B are properly positioned and the probe itself is centered within tolerances in the mounting block 18, is extremely difficult.

The device of the present invention is utilized in the same devices as the prior art device as shown in FIG. 1, but in the forms as shown in FIGS. 2, 3 and 4. The probe arm 10 again mounts a probe assembly illustrated generally at 25, and this probe assembly includes the probe needle 26 made up of separate electrodes 27 and 28, separated by an insulating layer 29. Rear contacts 30,30 and forward contacts 31,31 are utilized with a test circuit 32. The test circuit 32 and contacts 30 and 31 are of usual design. The electrodes are held in a mounting block 35 which can be rectilinear in cross section to prevent rotation of erroneous assembly, and as shown is square. The electrodes extend only a short way into the mounting block 35 and are trimmed off. The mounting block is made of insulating material (a suitable moldable plastic) and the electrodes can easily be molded into place. The rear portions 36 of the mounting block are enlarged to fit into a provided groove to properly orient the probe with respect to its holder.

The mounting block 35 and the probe needle 26 are mounted through an opening defined in a locater sleeve 37. The locater sleeve 37 is also made of insulating moldable plastic material and is circular in cross section on its outer periphery, and the opening through the center is of course the mating cross section for the mounting block 35. At the outer end (the probe needle end) of the locater sleeve there are molded in place two clamp jaws 38 and 39, which have openings 38A and 39A therethrough. The openings are filled during molding of the sleeve 37 to hold the jaws properly positioned in the sleeve assembly. The jaws are metal or other suitable electrical conductor. The outer end of the locater sleeve is molded into an expanding frusto-conical shape (in direction toward needle 26) having an outer frusto-conical surface 42. This surface 42 mates with a mating frusto-conical interior surface on the open end of an adapter 43. The outer surface of the adapter is cylindrical and the adapter has a flange 44 at the rear portion thereof for location on the probe arm. In addition, a locater pin 45 can be utilized for locating the adapter 43 properly. The adapter is made of aluminum or similar material, and fits within the provided opening on the probe arm 10. The locater sleeve 37 operates like a collet, and the lugs or jaws 38 and 39 are made so that they have metallic surfaces facing each other and these surfaces can be formed into a general V-shape as shown in FIG. 3. The inner ends of the lugs 38 and 39 are shown at 46 and 47, respectively. The end of the locater sleeve is split transversely with slits 49 as shown in FIG. 3 so the jaws can be clamped together.

The locater sleeve or collet has a threaded exterior end portion indicated at 50, that extends outwardly beyond the flange 44, and a nut 51 is threaded over the threaded end portion 50 to pull the conical surface 42 of the collet against the mating conical surface of the adapter to clamp the jaws downwardly toward the electrodes 27 and 28, respectively. When the nut 51 is tightened down, the slits in the end of sleeve 37 tend to close so the device clamps the lugs 38 and 39 against the respective electrodes, positively centering the electrodes forming needle 26 with respect to the adapter 43, and making electrical contact between the lugs 38 and 39 and the respective electrodes 27 and 28. Then, when the probe is in its forward position or test position as shown in dotted lines, a core to be tested will be surrounding the probe 26, and the end surfaces of the lugs 38 and 39 mate with the contacts 30,30, and the electrodes 27 and 28 respectively, will engage the contacts 31,31 so that the test circuits are completed through the opposite sides of the probe, which are insulated from each other, for testing of magnetic cores in the known manner.

The block 35 has sufficient clearance with its opening in sleeve 37 to permit the jaws to tighten onto the probe electrodes before the block is clamped. The slits 49 extend a sufficient distance from the end of the sleeve 37 to permit the tightening of the jaws.

The mating frusto-conical surface provide the centering and clamping action to hold the probe needle 26 centered.

The total indicated run out on prior art probes such as that shown in FIG. 1 could only be reduced to 4 mils at best. In the present device total indicated run out as low as one-half mil is possible. This increase in accuracy is extremely important when it is realized that the clearance between the core opening and the electrodes is typically only 1 mil. Further, to appreciate the small size of the electrodes, they have to be inserted in some instances into an 8 mil diameter core opening. Of course, other larger size probes are used as well, depending on the core size, but in all cases the present device is simple and cheap to make, and is accurately made.

While the description does show specifically the split probe needle construction, in some instance a solid probe needle is usable as electrode means and this invention is equally usable with the solid probe needle.

Also the wedging surfaces for clamping the jaws onto the probe needle do not have to be frusto-conical, but could be wedging planar surfaces or other configuration to clamp the jaws onto the needle.

What is claimed is:

1. A probe construction for use in magnetic core testing machines comprising a probe assembly including a pair of elongated electrodes spaced apart and separated by insulating material, clamping means for engaging said electrodes, said clamping means comprising a chuck means having a pair of electrically conductive jaws having exposed metallic surfaces on the face thereof facing in the direction of outwardly extending portions of said elongated electrodes, each of said jaws engaging a separate one of said electrodes, means to tighten said jaws against said electrodes to hold said electrodes, and means for mounting said probe assembly in a core testing machine.

2. The combination as specified in claim 1 wherein said jaws are mounted in a sleeve, a mounting tube, said sleeve being mounted in said mounting tube and passing therethrough, a first end of said sleeve adjacent said jaws being split to permit relative movement of said jaws toward each other, the first end of said sleeve having means defining an outwardly facing expanding frusto-conical surface, an inwardly facing frusto-conical surface defined on the interior of said mounting tube, and means to tighten said sleeve in direction to urge said outwardly facing frusto-conical surface against the inwardly facing frusto-conical surface of said mounting tube to thereby clamp the jaws against said electrode and center said electrode with respect to the frusto-conical inner surface of said mounting tube.

3. The combination as specified in claim 2 and contact means positioned to be intercepted by the outer end portions of said electrode, comprising separate contact means contacting each of said electrodes, said jaws forming exposed metal faces spaced radially outwardly from said electrodes and each respectively in contact with one of said electrodes, and separate contact means contacting each of the exposed metal faces of said jaws to complete electrical circuits for testing magnetic cores, when said probe assembly is moved to a predetermined position.

4. The combination as specified in claim 3 and a mounting block of rectilinear cross section mounting said electrodes to prevent twisting of said electrodes inside said sleeve.

5. A probe construction for use in magnetic core testing machines comprising a probe assembly including a pair of electrically conductive jaws presenting forwardly facing surfaces for engaging a pair of laterally spaced contacts contained in the electrical circuitry of a core testing machine, an insulating block extending rearwardly from said jaws and having a portion thereof projecting forwardly between said jaws past the forwardly facing surfaces of said jaws, a pair of elongated electrodes having adjacent ends held in a spaced relationship with each other in said insulating block, one of said electrodes projecting forwardly between one of said jaws and said projecting insulating portion and the other of said electrodes projecting forwardly between the other of said jaws and said insulating portion so as to be engageable by additional contacts contained in the circuitry of said machine, each of said jaws having a rearwardly and inwardly inclining surface, means providing a complementally inclined surface for each of said jaws, and means for pulling said jaws rearwardly so that the inclined surfaces thereon bear against said complementally inclined surfaces to cam said jaws inwardly to clamp said electrodes against said projecting insulating portion.

6. The combination as specified in claim 5 in which said pulling means includes an insulating sleeve having portions thereof interconnecting portions of said jaws so that when said sleeve is pulled rearwardly said engaging portions thereof retract said jaws to cam the jaws against said electrodes.

7. The combination as specified in claim 6 in which said sleeve has a threaded rear end, and means threadedly carried on said rear end for pulling said sleeve, said last-mentioned means bearing against a rear portion of said means providing said complementally inclined surfaces.

8. The combination as specified in claim 7 in which said jaws have openings extending from side to side thereof, said sleeve being of plastic material and having integral portions confronting the sides of said jaws and also portions thereof extending into said openings to interconnect said sleeve with said jaws so that pulling of said sleeve rearwardly cams said jaws inwardly against said electrodes.

9. A probe construction for use in magnetic core testing machines comprising an elongated mounting block of insulating material having a non-circular cross section and a forwardly projecting integral insulating layer, a pair of elongated electrodes having their adjacent ends embedded in said mounting block and extending along said projecting insulating layer, a pair of electrically conductive jaws, one jaw engaging one of said electrodes and the other jaw engaging the other of said electrodes, said jaws having tapered outer surfaces inclining rearwardly and inwardly, a tubular adapter having a tapered interior surface for each jaw complementing that on said jaws, a locater sleeve circumjacent said mounting block and innerjacent said adapter, said locater sleeve having a non-circular bore corresponding to the non-circular cross section of said mounting block to prevent twisting of said block and said electrodes embedded therein, means connecting each of said jaws to said sleeve at the forward end thereof, means engaging the rear end of said sleeve for retracting said sleeve to cam the tapered surfaces of said jaws against said complemental surfaces to clamp said jaws against portions of said electrodes.

10. The combination as specified in claim 9 in which said jaws have transverse openings therethrough and said connecting means includes integral portions carried on said sleeve extending forwardly to each side of said jaws and into said openings so that when said sleeve is retracted said jaws are moved rearwardly.

11. The combination as specified in claim 10 in which the integral portions to each side of one jaw form a slit with the corresponding portions to each side of the other jaw to permit said jaws to be clamped together.

12. The combination as specified in claim 11 in which said openings are cylindrical and said portions on said sleeve are also cylindrical and of the same diameter as said openings.

13. A probe construction for use in magnetic core testing machines comprising an elongated block of insulating material having an integral portion projecting forwardly therefrom, a pair of elongated electrodes having their corresponding ends fixedly retained in said block and projecting along opposite sides of said projecting block portion, first and second electrically conductive jaws having forwardly facing surfaces spaced rearwardly from the forward ends of said electrodes for engaging contacts contained in the circuitry of a core testing machine, the forward end portions of said electrodes being engageable with additional contacts contained in the test circuit of said machine, the outer surfaces of said jaws tapering rearwardly and inwardly, a tubular member having a tapering surface for each jaw complementing that of said jaws, and means for preventing twisting of said block and for pulling said jaws rearwardly to cause their said tapered surfaces to cam against said complementally tapered surfaces to force said jaws inwardly against portions of said electrodes to clamp said electrodes against said projecting block portion.

14. The combination as specified in claim 13 in which said retracting means includes an insulating sleeve and said jaws have openings extending transversely therethrough for receiving therein portions integral with said sleeve so that when said sleeve is retracted said tapered surfaces on said jaws are cammed against said complementally tapered surfaces to force said jaws inwardly against said electrode portions.

15. The combination as specified in claim 14 in which said sleeve is threaded at its rear end and a nut threadedly mounted thereon for pulling said sleeve rearwardly to effect said clamping action.

* * * * *